United States Patent
Liao (10) Patent No.: US 10,187,551 B2
(45) Date of Patent: Jan. 22, 2019

(54) MULTIFUNCTION PERIPHERAL SYSTEM AND CONTROL METHOD OF MULTIFUNCTION PERIPHERAL SYSTEM FOR PROVIDING PRINTING INFORMATION BASED ON PRINTING VERIFICATION INFORMATION

(71) Applicant: AVISION INC., Hsinchu (TW)

(72) Inventor: Chun-Chieh Liao, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/674,679

(22) Filed: Aug. 11, 2017

(65) Prior Publication Data
US 2018/0234587 A1 Aug. 16, 2018

(30) Foreign Application Priority Data
Feb. 10, 2017 (TW) .............................. 106104460 A (51) Int. Cl.
*G06F 3/12* (2006.01)
*H04N 1/00* (2006.01)
(Continued)

(52) U.S. Cl.
CPC ......... *H04N 1/4426* (2013.01); *G06F 3/1205* (2013.01); *G06F 3/1222* (2013.01); *G06F 3/1238* (2013.01); *G06F 3/1253* (2013.01); *G06F 3/1288* (2013.01); *H04N 1/00244* (2013.01); *H04N 1/00326* (2013.01); *G06F 21/608* (2013.01); *H04N 1/0023* (2013.01); *H04N 1/00344* (2013.01); *H04N 1/00408* (2013.01); *H04N 1/32122* (2013.01); *H04N 2201/0039* (2013.01); *H04N 2201/0082* (2013.01); *H04N 2201/0094* (2013.01); *H04N 2201/3216* (2013.01); *H04N 2201/3235* (2013.01)

(58) Field of Classification Search
None
See application file for complete search history.

(56) References Cited

U.S. PATENT DOCUMENTS

2007/0023516 A1 2/2007 Chapman et al.
2014/0122885 A1* 5/2014 Wu .................. H04L 29/06
713/171
(Continued)

FOREIGN PATENT DOCUMENTS

TW 200622638 A 7/2006
TW M511082 U 10/2015

*Primary Examiner* — Miya J Williams (57) ABSTRACT

A multifunction peripheral system includes a server and a multifunction peripheral. The server is configured to access printing information from a first electronic device, and is further configured to generate printing verification information corresponding to the printing information. The multifunction peripheral has a communication connection with the server. The multifunction peripheral is configured to access a detectable identifier, which comprises information to be verified, from a second electronic device, and the multifunction peripheral further configured to ask the server the printing information according to the detectable identifier. When the information to be verified is identical to the printing verification information, the server provides the printing information to the multifunction peripheral.

12 Claims, 7 Drawing Sheets

(51) Int. Cl.
*H04N 1/32* (2006.01)
*H04N 1/44* (2006.01)
*G06F 21/60* (2013.01)

(56) References Cited

U.S. PATENT DOCUMENTS

2015/0063661 A1* 3/2015 Lee .................. G06F 3/011
  382/124
2016/0284216 A1* 9/2016 Kurose ............ G08G 1/096791

* cited by examiner

MULTIFUNCTION PERIPHERAL SYSTEM AND CONTROL METHOD OF MULTIFUNCTION PERIPHERAL SYSTEM FOR PROVIDING PRINTING INFORMATION BASED ON PRINTING VERIFICATION INFORMATION

CROSS-REFERENCE TO RELATED APPLICATIONS

This non-provisional application claims priority under 35 U.S.C. § 119(a) on Patent Application No(s). 106104460 filed in Taiwan, R.O.C. on Feb. 10, 2017, the entire contents of which are hereby incorporated by reference.

BACKGROUND

Technical Field

This disclosure relates to a multifunction peripheral, a multifunction peripheral system and a control method of a multifunction peripheral system, and particularly to a multifunction peripheral, a multifunction peripheral system and a control method of a multifunction peripheral system with a user identification function.

Related Art

Along with the digitization of data, office automatic apparatuses, such as a scanner, a photocopier, a printer and so on, are set up in an office. A user is able to conduct a word processing task by the office automatic apparatuses. In practice, these different machines take up a lot of space in the offices. Furthermore, the user has to operate a different machine whenever the user needs another function. It causes inconvenience to the users. Therefore, a multifunction peripheral (MFP) that integrates several functions including photocopying, printing and scanning was invented to resolve the problems mentioned above.

Along with the progress of communication technology, an electronic device, such as a personal computer (PC), a pad or a smart phone, can communicate with a printer via supported communication specifications including wired and wireless ways, for instance, the Internet, universal serial bus, IEEE 1394, Bluetooth and so on. In this way, files can be sent to the printers for printing.

However, in practice, there is no convenient user identifying mechanism that is capable of ensuring the confidentiality of a printed document and the convenience of printing when another user or multiple users would like to use the multifunction peripheral to print. The most common solution is that the user has to move to the location of the multifunction peripheral for swiping the user's identification card, and then the desired document can be printed out when the user sends an instruction to the multifunction peripheral to print. Though this method can ensure the printed documents from being taken by other people, it results in considerable inconvenience. On the other hand, when a user A wants to provide a user B with a document, the user A has to operate the machine in person to print out the document so that the document can be handed to the user B; and thus, it could lead to considerable inconvenience in the situation that the user A goes out but wants to give the document to the user B.

SUMMARY

According to one or more embodiments, this disclosure provides a control method of a multifunction peripheral system. The multifunction peripheral system comprises a server and a multifunction peripheral. The multifunction peripheral has a communication connection with the server. In the control method of the multifunction peripheral system, printing information is provided to the server. The server generates printing verification information, which corresponds to the printing information. A detectable identifier, which includes information to be verified, is provided to the multifunction peripheral. The multifunction peripheral asks the server the printing information according to the detectable identifier. The server determines whether the information to be verified is identical to the printing verification information. When the information to be verified is determined as identical to the printing verification information, the server provides the printing information to the multifunction peripheral by the server.

According to one or more embodiments, this disclosure provides a multifunction peripheral including a printer, a reader and a processor. The processor is electrically connected to the reader and the printer. The printer is configured to print a file. The reader is configured to access a detectable identifier from an electronic device. The processor is configured to ask the server the printing information according to the detectable identifier. The processor instructs the printer to print the file according to the printing information when the processor accesses the printing information from the server.

According to one or more embodiments, this disclosure provides a multifunction peripheral system including a server and a multifunction peripheral. The server is configured to access printing information from a first electronic device, and is further configured to generate printing verification information corresponding to the printing information. The multifunction peripheral has a communication connection with the server. The multifunction peripheral is configured to access a detectable identifier, which comprises information to be verified, from a second electronic device, and the multifunction peripheral further configured to ask the server the printing information according to the detectable identifier. When the information to be verified is identical to the printing verification information, the server provides the printing information to the multifunction peripheral.

In view of the above description, by the aforementioned structure and method, a user is able to simply provide a detectable identifier to instruct a multifunction peripheral to print a file, which the user would like to print. In practice, when a first user would like to provide a document to a second user but the first user and the second user are far apart, the first user is able to use the aforementioned structure and method so that the second user may simply receive the document. Therefore, the second user is able to provide a detectable identifier to the multifunction peripheral for printing rather than manually input a password. This process is instinctive and convenient.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
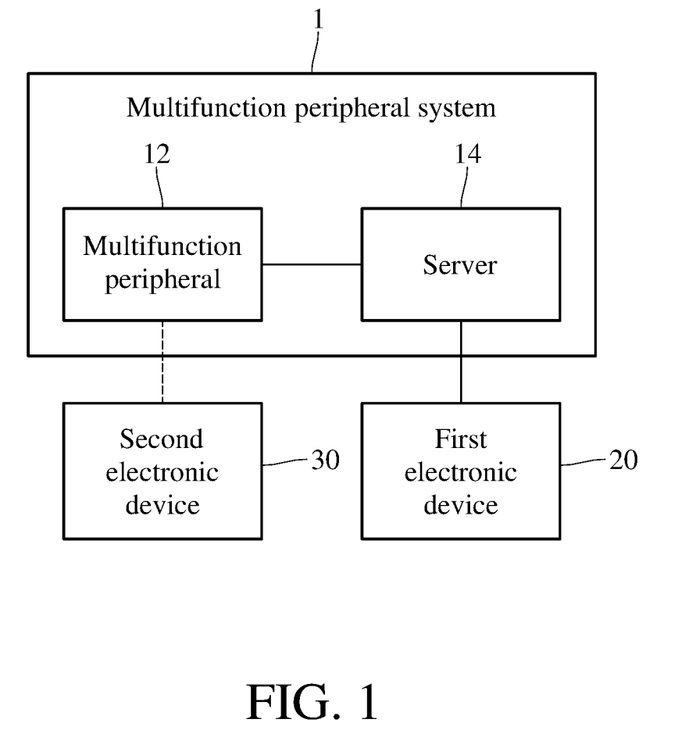
FIG. 1 is a functional block diagram of a multifunction peripheral system in an embodiment of this disclosure.

Please refer to FIG. 1, which is a functional block diagram of a multifunction peripheral system in an embodiment of this disclosure. A multifunction peripheral system 1 includes a server 14 and a multifunction peripheral 12. The multifunction peripheral 12 has a communication connection with the server 14. The multifunction peripheral 12 communicates with the server 14 by, for example, a wired or wireless method. The first electronic device 20 communicates with the server 14 by, for example, a wired or wireless method. This disclosure does not intend to limit the structure of the communication between the multifunction peripheral 12 and the server 14 and the structure of the communication between the first electronic device 20 and the server 14.

The server 14 is used to obtain printing information from the first electronic device 20. The server 14 is further used to generate printing verification information, which corresponds to the printing information. For example, the printing information includes textual information or graphic information. In an embodiment, the printing information includes a file to be printed and printing configuration setting, which is at least for indicating an amount of times of printing the file to be printed or a printing form of the file to be printed.

In an embodiment, the multifunction peripheral 12 is used to obtain information to be verified from a second electronic device 30, and then the multifunction peripheral 12 provides the information to be verified to the server 14 for verification, which likes determining whether the second electronic device 30 has permission to obtain the printing information from the server 14 and execute printing according to the printing information. In an embodiment, the server 14 is used to determine whether the information to be verified is identical to the printing verification information. When the server 14 determines that the information to be verified is identical to the printing verification information, the server 14 provides the printing information to the multifunction peripheral 12, and then when the multifunction peripheral 12 obtains the printing information, the multifunction peripheral 12 executes printing according to the printing information. As described above, the printing information includes, for example, the file to be printed and the printing configuration setting. The multifunction peripheral 12 prints the file to be printed according to the printing configuration setting. In practice, the server 14 may be installed into the multifunction peripheral 12, or the server may be installed independently of the multifunction peripheral 12. The installment of the server 14 can be designed according to practical requirements by a person having ordinary skill in the art, and is not limited to this disclosure.

The printing verification information is used as a basis for verification. How to execute the verification would be explained later. For example, the printing verification information includes a combination of text or numerals as a verification code. As another example, the printing verification information includes an image as a basis for the verification. In practice, the server 14 is able to generate the printing verification information using an algorithm according to a hardware machine code of the first electronic device 20 or the time or the serial number of receiving the printing information by the server 14. The above description is merely exemplified, and in practice, and does not intent to limit how the verification executes.

The multifunction peripheral 12 is used to obtain a detectable identifier from the second electronic device 30. The detectable identifier includes information to be verified. The multifunction peripheral 12 is further used to ask the server 14 the printing information according to the detectable identifier. When the information to be verified is identical to the printing verification information, the server 14 provides the printing information to the multifunction peripheral 12. Please refer to the following examples and explanation for the related details. In another embodiment, the multifunction peripheral 12 asks the server 14 the printing information further according to the detectable identifier and a printing password, which is, for example, provided to the multifunction peripheral 12 by the second electronic device 30. In practice, the second electronic device 30 provides the detectable identifier and the printing password respectively by different communication methods, so that the probability that the detectable identifier and the printing password are stolen at the same time may be reduced. Otherwise, a user may manually input the printing password by an operation interface of the multifunction peripheral 12. For example, the printing password is obtained by the user before the user executes printing, or the printing password is generated when the first electronic device 20 uploads the file to the server 14. The security level of the process that the multifunction peripheral 12 asks the printing information may be higher.

Figure 2:
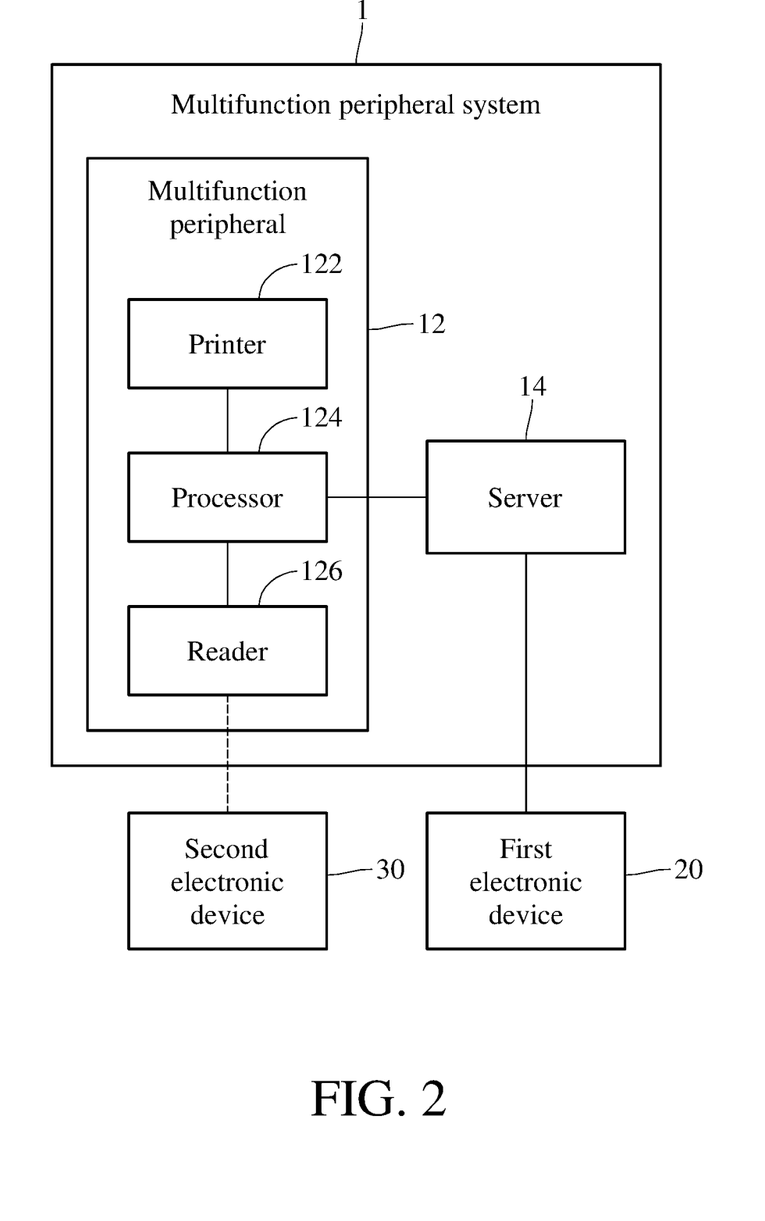
FIG. 2 is a detailed functional block diagram of a multifunction peripheral in an embodiment of this disclosure.

Please refer to FIG. 2 for more concrete explanation of the multifunction peripheral. FIG. 2 is a detailed functional block diagram of a multifunction peripheral in an embodiment of this disclosure. The multifunction peripheral 12 includes a printer 122, a reader 126 and a processor 124. The processor 124 is electrically connected to the reader 126 and the printer 122 o The printer 122 is used to print a file. The related structure and operation of the printer 122 can be designed according to practical requirements by a person having ordinary skill in the art, so they are not described in detail herein.

The reader 126 is used to obtain the detectable identifier from the second electronic device 30. The detectable identifier is, for example, a bar code, a quick response code (QR code) or other type of two-dimensional code. At this time, the reader 126 includes a reader corresponding to the two-dimensional code according to the form of the detectable identifier. More concretely, in an embodiment, the second electronic device 30, for example, displays the two-dimensional code by a screen of the second electronic device 30 for the reader 126 to read the two-dimensional code. Otherwise, in another embodiment, the detectable identifier is, for example, signal information provided by a radio frequency identification (RFID) tag. At this time, the reader 126 includes a RFID reader. More concretely, there is, for example, a tag on the second electronic device 30 to provide the detectable identifier for the reader 126 to read it. In yet another embodiment, the reader 126 is able to obtain the detectable identifier from the second electronic device 30 by Bluetooth (BT) communication.

The processor 124 is used to ask the server 14 the printing information according to the detectable identifier. When the processor 124 obtains the printing information from the server 14, the processor 124 instructs the printer 122 to print a file according to the printing information. In practice, the processor 124 includes, for example, a communication component (not shown in the figures). The processor 124 communicates with the server 14 by the communication component to exchange or obtain information. For example, the communication component may support wired or wireless communication. This disclosure does not intend to limit which kind of communication the communication component supports.

Figure 3:
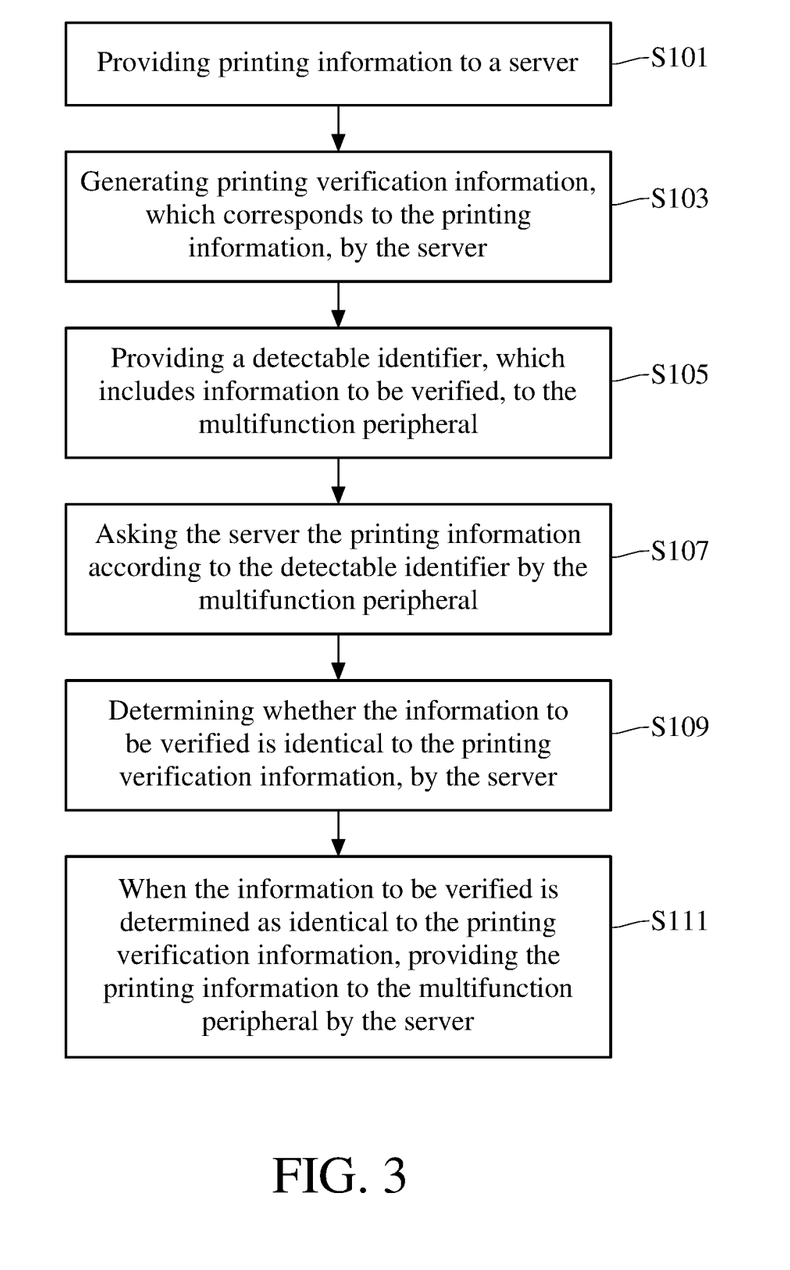
FIG. 3 is a flow chart of a control method of a multifunction peripheral system in an embodiment of this disclosure.

Corresponding to the above statement, this disclosure also provides a control method of the multifunction peripheral system. Please refer to FIG. 3 for the explanation of the control method of the multifunction peripheral system. FIG. 3 is a flow chart of a control method of a multifunction peripheral system in an embodiment of this disclosure. The aforementioned control method is applied to the multifunction peripheral system 1 which includes the server 14 and the multifunction peripheral 12. The multifunction peripheral 12 has a communication connection with the server 14. In step S101 of the control method of the multifunction peripheral system, printing information is provided to the server 14. In step S103, the server 14 generates printing verification information corresponding to the printing information, and then, in step S105, a detectable identifier is provided to the multifunction peripheral 12. The detectable identifier includes information to be verified. In step S107, the multifunction peripheral 12 asks the server the printing information according to the detectable identifier. In step S109, the server 14 determines whether the information to be verified is identical to the printing verification information. In step S111, when the information to be verified is determined as identical to the printing verification information, the server 14 provides the printing information to the multifunction peripheral.

Figure 4:
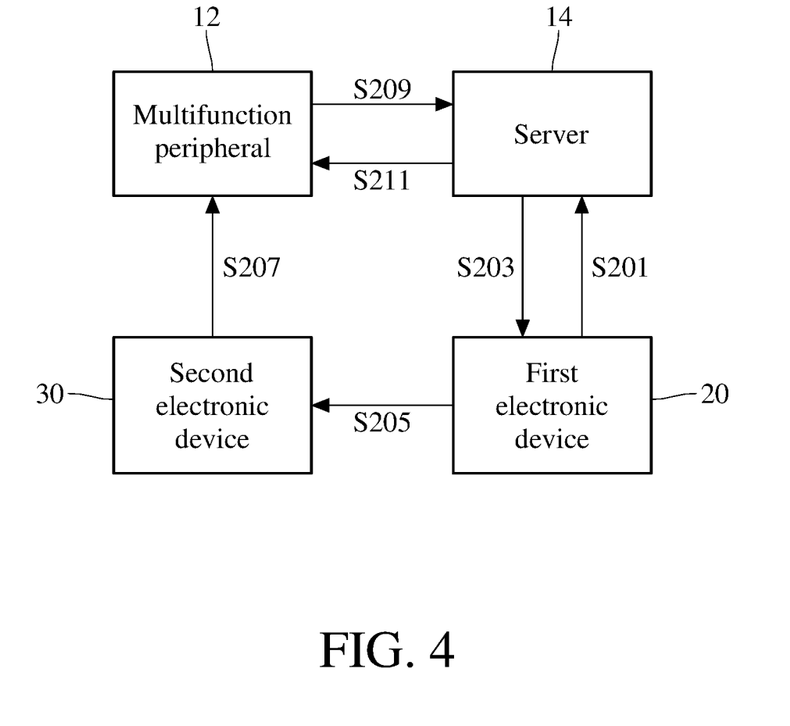
FIG. 4 is a schematic diagram of operation of a multifunction peripheral in an embodiment of this disclosure.

Please refer to FIG. 4 for explanation of operation of the multifunction peripheral. FIG. 4 is a schematic diagram of operation of a multifunction peripheral in an embodiment of this disclosure.

In step S201, the first electronic device 20 provides the printing information to the server 14.

The server 14 generates the printing verification information which corresponds to the printing information received in the step S201.

In step S203, the server 14 provides the printing verification information to the first electronic device 20.

In step S205, the first electronic device 20 provides the printing verification information to the second electronic device 30.

In step S207, the second electronic device 30 provides the detectable identifier, which includes the information to be verified, to the multifunction peripheral 12. In this embodiment, the second electronic device 30 considers the printing verification information, which is received from the first electronic device 20, to be the information to be verified.

In step S209, the multifunction peripheral 12 asks the server 14 the printing information according to the detectable identifier. In practice, the multifunction peripheral 12 is able to obtain the information to be verified from the detectable identifier, and then the multifunction peripheral 12 provides the information to be verified to the server 14 for verification.

In step S211, the second electronic device 30 considers the printing verification information to be the information to be verified, so that the server 14 determines that the information to be verified is identical to the printing verification information. At this time, the server 14 provides the printing information to the multifunction peripheral 12 so that the multifunction peripheral 12 is able to print the document file according to the printing information.

Corresponding to FIG. 4, in a practical situation, the first electronic device 20 is the cell phone of a first user, the second electronic device 30 is the cell phone of a second user, and the multifunction peripheral 12 is installed in an office. When the first user goes out of the office but would like to provide a document file to the second user or entrust the second user with the task of printing the document file, the first user is able to upload the file, as the printing information, to the server 14 by the aforementioned steps. After that, the first user provides the printing verification information to the second user so that the second user is able to instruct the multifunction peripheral 12, according to the printing verification information, to obtain and print the corresponding document file.

Figure 5:
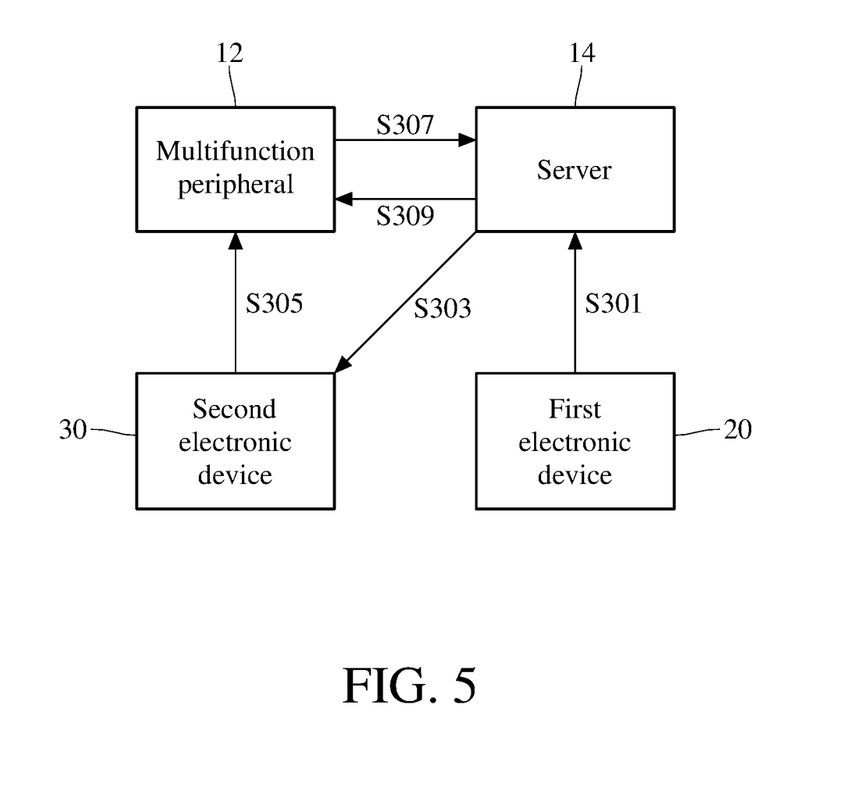
FIG. 5 is a schematic diagram of operation of a multifunction peripheral in another embodiment of this disclosure.

Please refer to FIG. 5, which is a schematic diagram of operation of a multifunction peripheral in another embodiment of this disclosure.

In step S301, the first electronic device 20 provides the printing information to the server 14, and the first electronic device 20 provides the address of the second electronic device 30 to the server 14. Otherwise, the first electronic device 20 is able to provide the identity (ID) of the second electronic device 30 to the server 14, and then the server 14 obtains the address of the second electronic device 30 by a lookup table.

The server 14 generates the printing verification information which corresponds to the printing information received in the step S301.

In step S303, the server 14 provides the printing verification information to the second electronic device 30.

In step S305, the second electronic device 30 provides the detectable identifier, which includes the information to be verified, to the multifunction peripheral 12. Therefore, the second electronic device 30 considers the printing verification information, which is received from the server 14, to be the information to be verified.

In step S307, the multifunction peripheral 12 asks the server 14 the printing information according to the detectable identifier. In practice, the multifunction peripheral 12 is able to obtain the information to be verified from the detectable identifier, and then the multifunction peripheral 12 provides the information to be verified to the server 14 for verification.

In step S309, the second electronic device 30 considers the printing verification information to be the information to be verified, so that the server 14 determines that the information to be verified is identical to the printing verification information. At this time, the server 14 provides the printing information to the multifunction peripheral 12 so that the multifunction peripheral 12 is able to print the document file according to the printing information.

The embodiment as shown in FIG. 5 is similarly applied to the situation described in the related statement of FIG. 4. In the embodiment as shown in FIG. 4, the first user is able to decide whether to provide the printing information to the second user, after obtaining the printing verification information. Compared to the embodiment as shown in FIG. 5, the embodiment in FIG. 4 includes one more step for verification. In contrast, in the embodiment as shown in FIG. 5, when the first user uploads the document file to the server 14, the first user does not need to execute other operation; it saves the operation time for the first user.

Figure 6:
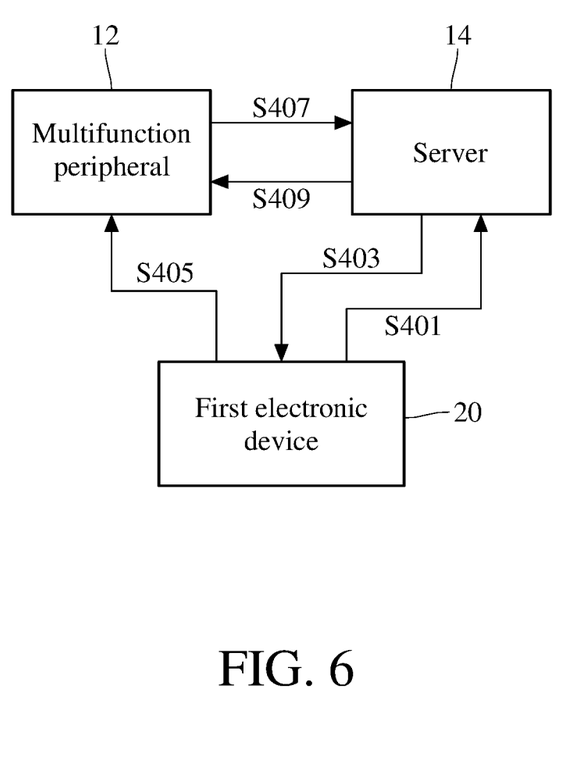
FIG. 6 is a schematic diagram of operation of a multifunction peripheral in yet another embodiment of this disclosure.

Please refer to FIG. 6, which is a schematic diagram of operation of a multifunction peripheral in yet another embodiment of this disclosure.

In step S401, the first electronic device 20 provides the printing information to the server 14. The server 14 generates the printing verification information which corresponds to the printing information received in the step S401.

In step S403, the server 14 provides the printing verification information to the first electronic device 20.

In step S405, the first electronic device 20 provides the detectable identifier, which includes the information to be verified, to the multifunction peripheral 12.

In step S407, the multifunction peripheral 12 asks the server 14 the printing information according to the detectable identifier. In practice, the multifunction peripheral 12 is able to obtain the information to be verified from the detectable identifier, and then the multifunction peripheral 12 provides the information to be verified to the server 14 for verification.

In step S409, the first electronic device 20 considers the printing verification information to be the information to be verified, so that the server 14 determines that the information to be verified is identical to the printing verification information. At this time, the server 14 provides the printing information to the multifunction peripheral 12 so that the multifunction peripheral 12 is able to print the document file according to the printing information.

In other words, the first user is able to print the document using the multifunction peripheral system 1 provided in this disclosure, besides allowing the second user to print the document, which the first user would like to print, by the multifunction peripheral system 1 provided in this disclosure. In this embodiment or the aforementioned embodiments, the server 14 is able to record information of printing of the first electronic device 20 and/or the second electronic device 30, such as the filename, print time or number of pages of the printed file; and thereby, the server 14 may be used for source management.

As described before, after the first electronic device 20 provides the printing information to the server 14, the server 14 stores the printing information for a while until it provides the printing information to the multifunction peripheral 12. In an embodiment, when the multifunction peripheral 12 obtains the printing information and prints the required document file, the multifunction peripheral 12 instructs the server 14 to clear the printing information in the server 14. In another embodiment, after the server 14 provides the printing information to the multifunction peripheral 12, the server 14 clears the printing information in the server 14. In yet another embodiment, the server 14 selectively clears the printing information in the server 14 according to the instruction from the first electronic device 20 or the second electronic device 30.

Figure 7:
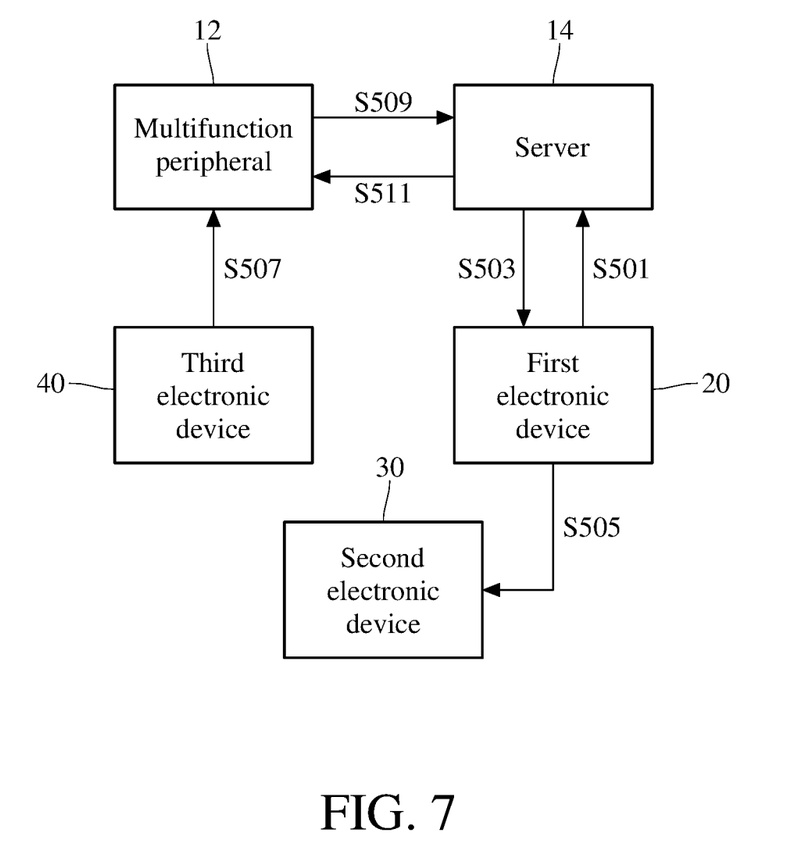
FIG. 7 is a schematic diagram of operation of a multifunction peripheral in yet another embodiment of this disclosure.

Please refer to FIG. 7 for the explanation of another situation. FIG. 7 is a schematic diagram of operation of a multifunction peripheral in yet another embodiment of this disclosure.

In step S501, the first electronic device 20 provides the printing information to the server 14.

The server 14 generates the printing verification information which corresponds to the printing information received in the step S201.

In step S503, the server 14 provides the printing verification information to the first electronic device 20.

In step S505, the first electronic device 20 provides the printing verification information to the second electronic device 30.

In step S507, the third electronic device 40 provides a detectable identifier, which includes information to be verified, to the multifunction peripheral 12. Because the third electronic device 40 does not obtain the printing verification information, the information to be verified which the third electronic device 40 has is different from the printing verification information.

In step S509, asks the server 14 the printing information according to the detectable identifier. In practice, the multifunction peripheral 12 is able to obtain the information to be verified from the detectable identifier, and then the multifunction peripheral 12 provides the information to be verified to the server 14 for verification.

In step S511, the server 14 server 14 determines that the information to be verified is not identical to the printing verification information. At this time, the server 14 provides alarm information to the multifunction peripheral 12. In another embodiment, the server 14 provides the alarm information to the first electronic device 20 or the second electronic device 30.

In other words, the third part cannot instructs the multifunction peripheral 12 to obtain and print the file to be printed from the server 14 without authorization.

In view of the above statement, a user is able to simply provide a detectable identifier to instruct a multifunction peripheral to print a file, which the user would like to print, by the aforementioned structure and method. In practice, when a first user would like to provide a document to a second user but the first user and the second user are far apart, the first user is able to use the aforementioned structure and method so that the second user may simply receives the document. Therefore, the second user is able to provide a detectable identifier to the multifunction peripheral for printing rather than manually input a password. This process is instinctive and convenient. On the other hand, in terms of management in a company, when a user would like to print a document, the amount of times of printing or a form of printing may be monitored and recorded as a printing record of the user by the server. At the same time, by providing the detectable identifier, it is also considerably practical to decrease the probability that the user take others' printed documents by mistake.

What is claimed is:

1. A control method of a multifunction peripheral system applied to the multifunction peripheral system which comprises a server and a multifunction peripheral which has a communication connection with the server, and the control method comprising steps of:
   providing printing information to the server by a first electronic device;
   providing identity information of a second electronic device to the server by the first electronic device;

generating printing verification information, which corresponds to the printing information, by the server;

providing the printing verification information to the second electronic device according to the identity information by the server;

considering the printing verification information to be information to be verified and providing a detectable identifier, which comprises the information to be verified, to the multifunction peripheral by the second electronic device;

asking the server for the printing information according to the detectable identifier by the multifunction peripheral; and determining that the information to be verified is identical to the printing verification information, by the server, so as to provide the printing information to the multifunction peripheral by the server;

wherein the first electronic device is different from the second electronic device.

2. The control method according to claim 1, further comprising steps of:

providing a printing password to the multifunction peripheral; and asking the server the printing information according to the detectable identifier and the printing password by the multifunction peripheral.

3. The control method according to claim 1, wherein the printing information comprises a file to be printed and printing configuration setting which is at least for indicating an amount of times of printing the file to be printed, and when the information to be verified is determined as identical to the printing verification information, the server provides the printing information to the multifunction peripheral, and then the multifunction peripheral prints the file to be printed according to the printing configuration setting.

4. The control method according to claim 3, wherein after the step of printing the file to be printed by the multifunction peripheral according to the printing configuration setting is performed, the control method further comprises removing the printing information in the server.

5. The control method according to claim 1, wherein after the step of providing the printing information to the multifunction peripheral by the server is performed, the control method further comprises removing the printing information in the server.

6. The control method according to claim 1, wherein the detectable identifier is a two-dimensional code or an identifier in radio frequency identification (RFID).

7. A multifunction peripheral system, comprising:

a server configured to access printing information from a first electronic device, access identity information of a second electronic device from the first electronic device, generate printing verification information corresponding to the printing information, and provide the printing verification information to the second electronic device according to the identity information; and a multifunction peripheral having a communication connection with the server, and configured to access a detectable identifier, which comprises information to be verified, from a second electronic device, and the multifunction peripheral further configured to ask the server the printing information according to the detectable identifier;

wherein the printing verification information is considered to be the information to be verified by the second electronic device, and when the server determines that the information to be verified is identical to the printing verification information, the server provides the printing information to the multifunction peripheral;

wherein the first electronic device is different from the second electronic device.

8. The multifunction peripheral system according to claim 7, wherein the multifunction peripheral further accesses a printing password from the second electronic device, and asks the server the printing information according to the detectable identifier and the printing password.

9. The multifunction peripheral system according to claim 7, wherein the printing information comprises a file to be printed and printing configuration setting which is at least for indicating an amount of times of printing the file to be printed, and when the information to be verified is determined as identical to the printing verification information, the server provides the printing information to the multifunction peripheral and the multifunction peripheral prints the file to be printed according to the printing configuration setting.

10. The multifunction peripheral system according to claim 9, wherein after the multifunction peripheral prints the file to be printed according to the printing configuration setting, the multifunction peripheral instructs the server to remove the printing information in the server.

11. The multifunction peripheral system according to claim 7, wherein after the server provides the printing information to the multifunction peripheral, the server removes the printing information in the server.

12. The multifunction peripheral system according to claim 7, wherein the detectable identifier is a two-dimensional code or an identifier in RFID.

* * * * *